United States Patent [19]
Van Benthuysen et al.

[11] 3,732,520
[45] May 8, 1973

[54] VARIABLE RESISTANCE CONTROL AND METHOD OF ASSEMBLING SAME
[75] Inventors: John D. Van Benthuysen; Thomas R. Beaver, both of Elkhart, Ind.
[73] Assignee: CTS Corporation, Elkhart, Ind.
[22] Filed: Jan. 2, 1969
[21] Appl. No.: 788,592

[52] U.S. Cl..................................338/180, 338/183
[51] Int. Cl. ...............................................H01c 9/02
[58] Field of Search....................338/176, 180, 181, 338/183

[56] References Cited
UNITED STATES PATENTS

| | | | |
|---|---|---|---|
| 3,445,802 | 5/1969 | Spaude | 338/180 X |
| 2,999,994 | 9/1961 | Bourns et al. | 338/183 X |
| 3,412,362 | 11/1968 | Woods et al. | 338/183 |
| 3,050,704 | 8/1962 | Dickenson et al. | 338/180 |
| 3,238,488 | 3/1966 | Langenbach et al. | 338/180 |
| 3,500,281 | 3/1970 | Kirkendall | 338/180 |

Primary Examiner—Lewis H. Myers
Assistant Examiner—D. A. Tone
Attorney—John J. Gaydos and Ralph E. Krisher, Jr.

[57] ABSTRACT

A housing encloses a lead screw, a contactor driven by the lead screw, and a collector and resistive path wipingly engaged by the contactor. A plurality of lead wires are anchored in cavities in a ceramic substrate which supports the resistive path and collector. At least one of the cavities is disposed at an angle to the resistive path supporting planar surface of the substrate and the lead wire disposed therein egresses therefrom adjacent to an end of the substrate. The threaded portion of the lead screw is supported in a journal bearing having a curved surface with a curvature that is approximately equal to or less than twice the reciprocal of the nominal diameter of the lead screw. The tail end of the lead screw is grooved and a thrust bearing integral with the housing interfits with the groove and prevents axial movement of the lead screw relative to the housing. A sealing member and the lead screw are assembled with the housing by positioning the sealing member on the lead screw and inserting the tail end of the lead screw through an opening while maintaining the longitudinal axis of the lead screw at an angle relative to the centerline of the opening. When the sealing member is compressed between the head of the lead screw and the housing, the tail end of the lead screw is moved in a direction transverse to the longitudinal axis of the lead screw so as to interfit the thrust bearing with the groove in the lead screw.

8 Claims, 6 Drawing Figures

PATENTED MAY 8 1973 3,732,520
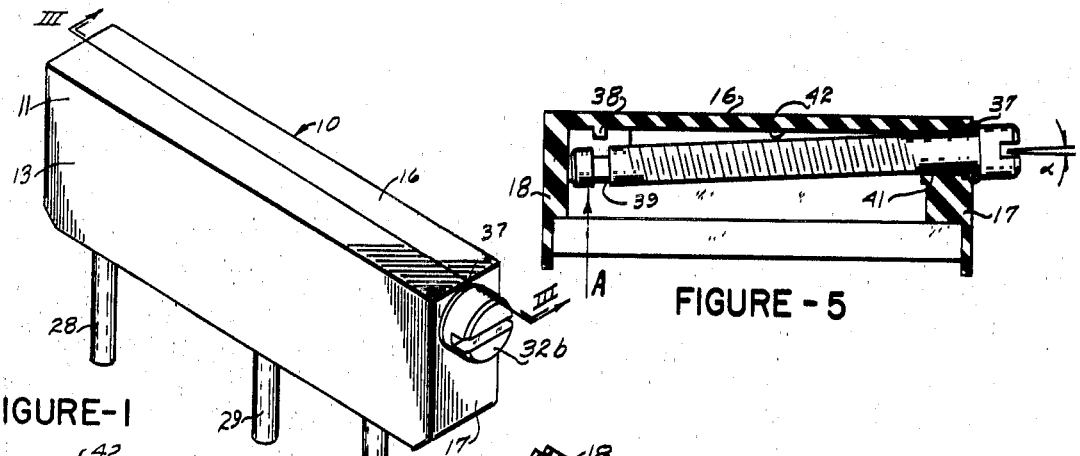
FIGURE-1
FIGURE-5
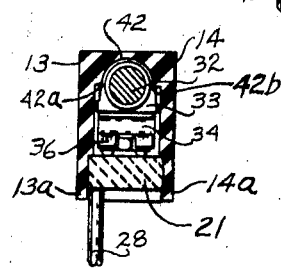
FIGURE-4
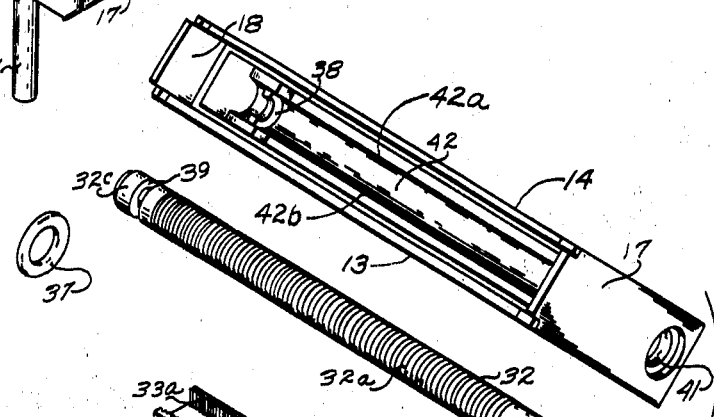
FIGURE-2
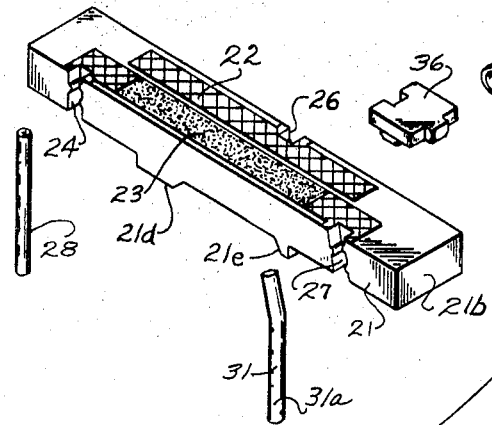
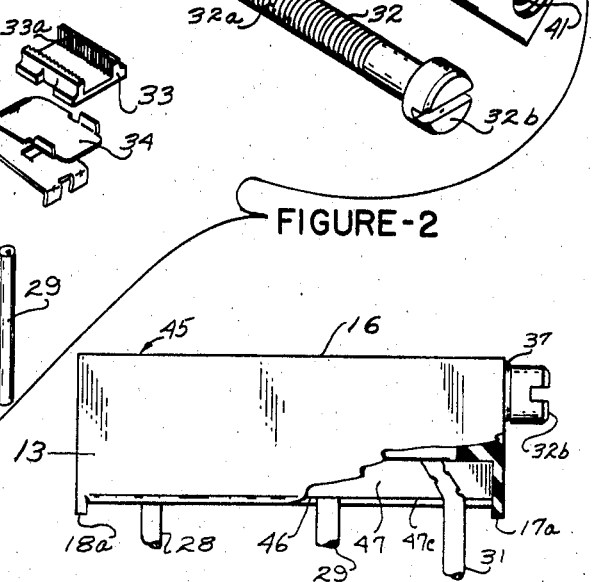
FIGURE-6
FIGURE-3
INVENTORS.
JOHN D. VAN BENTHUYSEN
THOMAS R. BEAVER
BY John J. Gaylor
ATTORNEY

VARIABLE RESISTANCE CONTROL AND METHOD OF ASSEMBLING SAME The present invention relates to variable resistance controls and, more particularly, to improvements in a variable resistance control of the rectilinear type and to a method of assembling such control.

Controls similar to the controls shown, e.g., in the Bourns et al. U.S. Pat. No. 2,999,994 are normally provided with a lead screw drivingly engaging means constrained to make wiping contact with a resistive path. It has been long recognized that longitudinal movement of the lead screw relative to the housing can result in objectionable changes in the setting of the control and can make precise adjustment of the control very difficult. Heretofore, several techniques have been used to limit axial movement of the lead screw relative to the housing. Two of the most notable of these techniques have involved the use of a retaining pin inserted through a hole in the housing and cooperating with a groove in the lead screw, or the use of a thrust bearing formed in situ around lands and grooves on the lead screw as shown for example in Van Benthuysen et al. U.S. Pat. No. 3,400,355. Both of these techniques have added to the cost of manufacturing such controls because of the expense of the retaining pin and thrust bearing and because of the time required to assemble such parts. Accordingly, it would be desirable to provide new and improved means for limiting axial movement of a lead screw relative to a contro housing and a new and improved method of assembling variable resistance controls.

It is also desirable, if not necessary, to maintain uniform contact pressure in variable resistance controls. When a lead screw operates as a reaction member for a contactor resiliently biased against a resistive path, it is desirable to support the lead screw in order to prevent the lead screw from deflecting intermediate the ends thereof and effectively reducing the contact pressure of the contactor against the resistive path. It is particularly desirable to provide such support when the lead screw is comprised of readily deformable thermoplastic or thermosetting polymers, e.g., nylon, Delrin, polyphenylene oxide, and polytetrafluoroethylene.

One type of variable resistance control that is becoming increasingly popular comprises a ceramic substrate that both supports a cermet resistive path and closes a molded housing. For some applications of this type of control, purchasers specify that a coating of epoxy or other material must be used to cover and seal the exterior of the ceramic substrate and to secure the substrate to the control housing. For other applications, such purchasers specify that epoxy materials may not be used and, accordingly, other means must be provided for securing the substrate to the housing. In either case, means usually should be provided for spacing the control from a supporting surface such as a printed circuit board. Accordingly, it would be desirable to provide an improved control wherein the housing is adapted for being secured to the substrate with or without the use of epoxy type materials.

When controls are used in printed circuit board applications, the terminal pins on such controls must be located so that they will register with standard circuit board openings. When such controls are miniaturized, it is often necessary to locate the terminals so close to the ends of the ceramic substrate that the relatively brittle substrate is weakened and thereafter easily cracked or broken. Therefore, it would be desirable to provide means whereby terminal pins may be located relatively near one or more ends of a ceramic substrate without unduly weakening such substrate.

Accordingly, it is a general object of the present invention to provide a new and improved variable resistance control. Another object of the present invention is to provide a variable resistance control having improved means for limiting axial movement of a lead screw relative to the control housing. An additional object of the present invention is to provide an improved method of assembling the component parts of a variable resistance control. A further object of the present invention is to provide a variable resistance control having a lead screw within a housing and a journal bearing for the threaded portion of the lead screw. Still another object of the present invention is to provide new and improved means for securing assembly of a variable resistance control. Still an additional object of the present invention is to provide a new and improved variable resistance control wherein one or more terminal pins are anchored in passageways adjacent to an end of a ceramic substrate without unduly weakening such substrate. Further objects and advantages of the present invention will become apparent as the following description proceeds, and the features of novelty characterizing the invention will be pointed out with particularity in the claims annexed to and forming a part of this specification.

Briefly, the present invention is concerned with a variable resistance control comprising a housing having a resistive path and a collector supported on a ceramic substrate closing a cavity in the housing. A contactor driven by a lead screw wipingly engages the resistive path and a clutch means permits the contactor to ratchet on the lead screw when the contactor reaches the end of its travel at either end of the housing. Lead wire terminals are anchored in cavities in the ceramic base. One of these cavities is angularly disposed so that the terminal anchored therein emerges from the cavity adjacent to an end of the substrate without unduly weakening the substrate. A journal bearing having a curvature less than or approximately equal to twice the reciprocal of the diameter of the threaded portion of the lead screw supports such threaded portion. In order to limit axial movement of the lead screw relative to the housing, a lead screw thrust bearing is formed integrally with the housing and interfits with a groove in the tail end of the lead screw. The present method comprises the steps of positioning an elastomeric sealing member on the lead screw, inserting the tail end of the lead screw through a lead screw receiving opening formed in a side wall of the control housing, inserting the body of the lead screw axially through the lead screw receiving opening while keeping the longitudinal axis of the lead screw at an angle relative to the axis of the lead screw receiving opening, compressing the elastomeric sealing member between the housing and the head of the lead screw, and thereafter moving the tail end of the lead screw transversely relative to the longitudinal axis of the lead screw and seating the groove formed in the tail end of the lead screw on the lead screw thrust bearing.

For a better understanding of the present invention, reference may be had to the accompanying drawings wherein the same reference numerals have been applied to like parts and wherein:

FIG. 1 is an isometric view of a variable resistance control made in accord with the present invention;

FIG. 2 is an exploded isometric view of the control shown in FIG. 1;

FIG. 3 is a sectional view taken along lines III—III in FIG. 1;

FIG. 4 is a sectional view taken along lines IV—IV of FIG. 3, assuming that FIG. 3 is shown in full;

FIG. 5 is a schematic representation of a step in the method of assembling the control of FIG. 2; and FIG. 6 is a side elevational view, with parts broken away, of a different embodiment of the invention.

Referring now to the drawings, a variable resistance control 10 is illustrated comprising a housing 11 having side walls 13 and 14, a top wall 16, and end walls 17 and 18 enclosing a hollow interior or cavity 19. The cavity 19 is closed by a ceramic substrate or base 21 supporting a collector 22 and a cermet film resistive path 23. The base 21 is provided with a plurality of cavities 24, 26, 27 having serrated surfaces and lead wire terminals 28, 29 and 31 are anchored therein by being deformed to fit the serrated surfaces. When the control 10 is assembled, as best illustrated in FIG. 3, the threaded portion 32a of a lead screw 32 clutchingly engages a contactor assembly comprising drive block 33, carrier spring 34, and a carbon button 36 that wipingly engages the collector 22 and resistive path 23 intermediate the ends thereof. In order to prevent the ingress of dust or other foreign matter into the cavity 19, an elastomeric sealing member illustrated as a rubber O-ring 37 is compressed between the slotted head 32b of the lead screw 32 and the wall 17 of the housing. Lead screw retaining means in the form of a thrust bearing 38 are formed integrally with the housing 11 and interfit with a groove 39 formed in the tail end 32c of the lead screw and thus prevent longitudinal movement of the lead screw 32 relative to the housing.

When the lead screw 32 is assembled with the housing 11, the elastomeric O-ring 37 is positioned on the lead screw and the lead screw is inserted through a passageway 41 in the housing wall 17. When inserting the lead screw, the longitudinal axis of rotation of the lead screw 32 is maintained at an angle α to the axis or centerline of the passageway 41 as illustrated in FIG. 5. When the lead screw 32 has been inserted through the passageway 41 to the maximum extent and the O-ring 37 has been compressed against wall 17, the tail end of the lead screw is moved in the direction of arrow A, i.e., in a direction transverse to the longitudinal axis of rotation of the lead screw, until the groove 39 of the lead screw interfits with the thrust bearing 38 and the threaded portion 32a of the lead screw is nestedly received by the journal bearing 42. The contactor is then placed adjacent the lead screw and the base 21 is positioned to close the cavity 19. Compression of the carrier spring portion 34 of the contactor between the upper surface 21a of the base 21 and lead screw 32 causes the lead screw 32 to bear against journal bearing 42 and prevents the groove 39 on the lead screw from disengaging the thrust bearing. Although any suitable means may be used to secure the base 21 in assembled relation; in the embodiment of FIGS. 1–5, the edges 13a, 14a, 17a, and 18a of the housing walls 13, 14 and 17, 18 are swaged around the edges of the base 21 to secure assembly of the base. During operation, when the contactor reaches its limits of travel, the spring 34 permits movement of the drive block 33 away from the lead screw 32 so that the threads 33a on the drive block may ratchet across the threads of the lead screw. After the control has been assembled, it may be mounted on any suitable not shown supporting surface. The spacers or stand-offs 21d and 21e maintain the lower surface 21c of the base 21 in a desired spaced relationship with the supporting surface.

It will be understood that the pressure of engagement of the carbon button 36 against the resistive path 23 will be substantially uniform for all settings of the control since the threaded portion 32a of the lead screw is supported by the bearing 42. In addition, bearing 42 prevents movement of the lead screw toward walls 13, 14 and corresponding objectionable movement of the carbon button 36 on the surface 21a of the base 21. By providing a bearing that conforms to the outer periphery of the lead screw, i.e., a bearing that extends at least partly around the lead screw and makes at least two point contacts with the lead screw, the lead screw is supported against deflection toward any one of walls 13, 14 or 16 of the housing when subjected to shock forces and during adjustment of the control 10. When the outer diameter of the threaded portion of the lead screw has a nominal diameter D and the surface of the bearing 42 is curvilinear as illustrated, it is preferable that the curvature K of the bearing be equal to or slightly less than two times the reciprocal of the diameter D. This relationship may be expressed mathematically as: $K \leq 2/D$ where K represents the curvature of the bearing 42 and D represents the diameter of the lead screw. The bearing 42 should extend around the lead screw a sufficient amount to prevent lateral deflection of the lead screw toward the side walls 13, 14 of the housing. The edges 42a, 42b of the bearing 42 are spaced apart a sufficient distance to avoid interference of such edges with the lead screw during assembly of the lead screw with the housing. Although the bearing 42 is illustrated as curvilinear and has a semi-circular configuration in the cross-sectional view of FIG. 4, it will be appreciated that the bearing may readily be formed with a pair of diverging relatively planar spaced surfaces against which the lead screw bears. In addition, the bearing may comprise two or more spaced surface segments instead of a continuous single segment as illustrated. In either case, the primary purpose of the bearing is to prevent deflection of the lead screw as the contactor is moved from one end to the other of the resistive path 23.

In prior art constructions, it has been necessary for the lead screw 32 to be relatively straight, i.e., neither bent or bowed between the ends thereof. Heretofore, this requirement has meant that relatively expensive materials and processes had to be used to produce rigid, straight lead screws. Although rigid straight lead screws may still be used in the practice of the present invention, it will be understood that the lead screw 32 may be made from relatively inexpensive thermoplatic or thermosetting materials. It has heretofore generally been conceded that synthetic materials could not be used in controls of the type herein disclosed because of the ease with which such materials are deformed and because of the difficulty of making from such materials lead screws that are sufficiently straight. The present invention solves both of these problems, since the bearing 42 prevents straight but resiliently deformable lead screws from flexing in response to pressure applied thereto by the contactor even when the bearing 42 comprises a signel planar reaction surface parallel to the external wall 16. In addition, the present invention permits the use of bowed or bent synthetic material lead screws because such lead screws are maintained in a straightened condition by the bearing 42.

The control 10 is particularly suitable for use in printed circuit applications and, accordingly, the terminals 28, 29, 31 are anchored in cavities in the base and adapted for insertion in apertures in printed circuit boards. In order that the terminals register properly with the apertures in a not shown printed circuit board, it is necessary to locate the terminal 31 relatively close to the end 21b of the base 21 as shown in FIG. 3. By arranging the cavity 27 to slope upwardly from the lower surface 21c and inwardly from the end 21b of the base 21, the mechanical strength of the substrate is preserved. The degree of declination of the cavity 27 relative to the upper surface 21a of the substrate 21 may vary, depending on the particular type of material used to fabricate the base, the dimensions of the base, and the dimensions and location of cavity 27. However, when the base 21 is made from high alumina and has a height of 0.080 inch and a width of 0.125 inch, the cavity 24 has an opening of 0.026 inch by 0.026 inch, and the terminal 31 has a diameter of 0.025 inch with the center of the terminal 31 entering the lower surface 21c of the base 0.046 inch from the end of the base 21, the angle $\gamma$ shown in FIG. 3 between a line normal to the surface 21c and the centerline of cavity 27 is approximately 32°. The terminal 31 may be bent prior to assembly with the base 21, or may be inserted in cavity 27 and then formed so that the end portion 31a thereof will project in a direction normal to the lower surface 21c of the base 21.

As hereinabove mentioned, assembly of the control 10 is secured by forming the edges of the side walls 13, 14 and end walls 17, 18 around the edges of the base. However, when the housing is formed of materials that are not readily deformable, or, when it is desired to use an adhesive such as an epoxy to secure the base to the hosuing, the preferred embodiment is illustrated in FIG. 6 wherein like reference numerals have been used to identify parts identical to corresponding parts in FIGS. 1–5.

The control 45 shown in FIG. 6 differs from the control 10 only in that a different base 47 is used and that an epoxy material 46 is used to seal the lower surface 47c of the base 47 and to secure the base 47 to the walls of the housing 11. Except for the base 47 and layer of epoxy, all other parts of the controls 10 and 45 are identical. However, in the control 45, the lower portions 17a, 18a of end walls 17, 18 project beyond the lower surface 47c of the base 47 and provide standoffs or spacers that space the bottom surface of the base 47 from a not shown circuit board or other supporting surface on which the control 45 is mounted.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed as new and desired to be secured by Letters Patent of the United States is:

1. A variable resistance control comprising a housing, a lead screw rotatably supported in the housing, a ceramic base closing the housing and supporting a resistive path and a collector on a first surface thereof, a plurality of cavities formed in said base, a contactor movable by the lead screw and wipably engaging the resistive path and said collector, and a lead wire terminal disposed in each of said cavities, at least one cavity being oriented in the base so that said at least one cavity makes an angle of less than 90° with said first surface.

2. The control of claim 1, wherein the base has a second surface substantially parallel to the first surface, and the lead wire terminal disposed in said at least one cavity has a first portion extending out of the base normal to said second surface and a second portion disposed at an angle of less than 90° to the first portion.

3. The control of claim 1, wherein the housing is provided with a plurality of walls and the end portions of at least two of such walls are formed around the base thereby to secure the base in assembled relationship with said walls.

4. A variable resistance control comprising a housing having a pair of side walls, a lead screw supported for rotation in the housing with a threaded portion extending between said side walls, a resistive path and a collector, a contactor movable by the lead screw and wipingly engaging the resistive path and the collector upon rotation of said lead screw, and a bearing formed integrally with said housing engaging the threaded portion of the lead screw and preventing lateral deflection of the threaded portion of the lead screw toward said side walls, said contactor resiliently biasing the threaded portion of the lead screw into engagement with said bearing.

5. The control of claim 4, wherein at least two laterally spaced points on the periphery of the threaded portion of the lead screw are in physical contact with said bearing.

6. The control of claim 4 wherein a thrust bearing is formed integrally with the housing, said lead screw having a tail end with a groove formed therein interfitting with the thrust bearing, said lead screw having an enlarged head disposed exteriorly of said housing, and an elastomeric sealing member is compressed between said head and said housing whereby said thrust bearing and said elastomeric sealing member cooperate to prevent longitudinal movement of the lead screw relative to the housing.

7. The control of claim 6 wherein said contactor resiliently biases the tail end of the lead screw against said thrust bearing thereby preventing disengagement of the thrust bearing from said groove.

8. A variable resistance control comprising a housing having a pair of side walls, a lead screw supported for rotation in the housing with a threaded portion extending between said side walls, a resistive path and a collector, a contactor movable by the lead screw and wipingly engaging the resistive path and the collector upon rotation of said lead screw, and a bearing fixed relative to said housing engaging the threaded portion of the lead screw and preventing lateral deflection of the threaded portion of the lead screw toward said side walls, said contactor resiliently biasing the threaded portion of the lead screw into engagement with said bearing.

* * * * *